United States Patent [19]

Nakahori et al.

[11] Patent Number: 5,079,110
[45] Date of Patent: Jan. 7, 1992

[54] ALKALINE STORAGE CELL

[75] Inventors: Shinsuke Nakahori; Ichirou Yoshida, both of Sumoto, Japan

[73] Assignee: Sanyo Electric Co., Ltd., Osaka, Japan

[21] Appl. No.: 670,410

[22] Filed: Mar. 15, 1991

Related U.S. Application Data

[63] Continuation of Ser. No. 423,313, Oct. 13, 1989, abandoned.

[30] Foreign Application Priority Data

Oct. 19, 1988 [JP] Japan .................. 63-263769

[51] Int. Cl.⁵ .................................. H01M 10/30
[52] U.S. Cl. .................................. 429/206; 429/223
[58] Field of Search ............ 429/206, 223, 218, 209; 252/182.1

[56] References Cited

U.S. PATENT DOCUMENTS 4,844,948  7/1988  Nakahori et al. .......... 429/223 X

FOREIGN PATENT DOCUMENTS

| 52-114929 | 9/1977 | Japan . |
| 55-24331 | 2/1980 | Japan . |
| 55-024331 | 2/1980 | Japan . |
| 0152682 | 9/1982 | Japan .................. 429/223 |
| 0165370 | 9/1984 | Japan .................. 429/223 |
| 60-124368 | 7/1985 | Japan . |
| 62-037874 | 2/1987 | Japan . |
| 62-071168 | 4/1987 | Japan . |
| 63-211563 | 9/1988 | Japan . |
| 63-224159 | 9/1988 | Japan . |

*Primary Examiner*—Anthony Skapars
*Attorney, Agent, or Firm*—Armstrong, Nikaido, Marmelstein, Kubovcik & Murray

[57] ABSTRACT

An alkaline storage cell having high utilization factor of the active material of the nickel positive electrode and excellent charge/discharge cycle characteristic is disclosed. The above utilization factor and cycle characteristic are improved by the effect of cobalt compound interposed between the plaque and the active material or provided on a surface of the active material and by the synergistic effect of both the above cobalt compound and lithium hydroxide added to the electrolyte mainly comprising potassium hydroxide.

6 Claims, 5 Drawing Sheets

ALKALINE STORAGE CELL

This application is a continuation of application Ser. No. 423,313 filed Oct. 13, 1989, now abandoned.

BACKGROUND OF THE INVENTION (1) Field of the Invention

This invention relates to an alkaline storage cell comprising a positive electrode of nickel, a negative electrode and an electrolyte, especially to an improvement of the positive electrode and the electrolyte.

(2) Description of the Prior Art

Recently, along with multi-functionization of equipment using a storage cell, a storage cell having larger capacity has been demanded. In response to this demand, the followings have been proposed.

(a) As disclosed in Japanese Patent Publication Kokai No. 62-37874, the utilization factor of an active material of a positive electrode is improved by forming a layer of conductive cobalt oxide between a surface of a plaque and the active material. In this construction, the utilization factor of nickel hydroxide as the active material, exceeds 90% because the discharge characteristic is improved mainly at the final stage of a discharge cycle.

(b) As disclosed in Japanese Patent Publication Kokai No. 62-71168, a porous metal plaque filled with an active material is immersed in a solution of acid cobalt salt and alkali-treated, whereby to form cobalt hydroxide on a surface of the active material.

(c) As disclosed in Japanese Patent Publication Kokai Nos. 63-211563 and 63-224159 and Japanese Patent Publication No. 59-10538, the characteristic of a nickel positive electrode is improved by adding lithium hydroxide to an electrolyte so that lithium hydroxide can act on the positive electrode. In the above nickel positive electrode, the cobalt compound does not independently constitute a layer but forms a solid solution or a mixed crystal together with nickel. In this construction, the utilization factor of an active material at the first several cycles is improved. Especially, if the electrolyte is produced by adding lithium hydroxide to a solution mainly comprising potassium hydroxide, the utilization factor of the active material at the first several cycles exceeds 90%.

However, (a) and (b) can further be improved. Since a commonly-used nickel sintered positive electrode already has high conductivity in its plaque, its discharge capacity is inevitably high. Therefore, remarkable effects cannot be obtained by improving the utilization factor of the active material.

(c) has the following problem. Lithium hydroxide promotes charging, whereby generating higher-order nickel oxyhydroxide ($\gamma$-NiOOH) than tervalent nickel oxyhydroxide ($\gamma$-NiOOH). $\gamma$-NiOOH temporarily shows high capacity because it is high in order, but is hard to discharge because of its comparative inactiveness. Therefore, $\gamma$-NiOOH is accumulated as a non-discharged active material while charge/discharge is repeated, which decreases the cell capacity. Further, since the accumulated non-discharged active material is low in density, the electrode plate is weakened. As a result, the active material comes off from the electrode plate, further decreasing the cell capacity.

SUMMARY OF THE INVENTION

Accordingly, a primary object of this invention is to offer an alkaline storage cell which has higher utilization factor of an active material.

Another object of this invention is to offer an alkaline storage cell which restrains the weakening of the electrode plate and thus prevents the capacity from decreasing even when charge/discharge is repeated.

The above objects are fulfilled by a rechargeable alkaline storage cell comprising a nickel positive electrode having an independent layer of cobalt compound; a negative electrode; and an electrolyte added with lithium hydroxide.

The cobalt compound may be formed of cobalt oxide and may be provided between a surface of a plaque of the positive electrode and an active material.

The nickel positive electrode may comprise a porous metal plaque retaining an active material mainly including nickel hydroxide, and the cobalt compound may be formed of cobalt hydroxide and provided on a surface of the active material.

It is for the following reasons that the above objects can be attained by the above construction.

Lithium hydroxide added to the electrolyte promotes charging, whereby comparatively inactive $\gamma$-NiOOH is easily formed. However, the nickel positive electrode has a highly conductive layer formed of cobalt compound only. Therefore, the above-mentioned $\gamma$-NiOOH is discharged, and thus its utilization factor is improved.

In addition, it does not occur that the non-discharged active material is accumulated as charge/discharge is repeated. Therefore, the electrode plate is not weakened even when charge/discharge is repeated, or the active material does not come off from the plate, either. As a result, the cell capacity is prevented from declining.

This invention is summarized in that the utilization factor of the active material of the nickel positive electrode and the charge/discharge cycle characteristic of the cell are improved by the effect of the highly conductive layer of cobalt compound only which is included in the nickel positive electrode and also by the synergistic effect of the above cobalt compound and lithium hydroxide added to the electrolyte mainly comprising potassium hydroxide.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE PREFERRED EMBODIMENTS

Embodiment I

(Example)

A porous nickel sintered plaque was immersed in cobalt nitrate having a specific gravity of 1.2 (at R.T.), and then the cobalt nitrate was changed into cobalt hydroxide in an alkaline solution. The above nickel plaque was heated in the air (200° C.) for an hour, whereby forming a layer of cobalt oxide on the surface thereof. The cobalt oxide layer preferably has a cobalt oxidation state of more than 2. The above plaque with the cobalt oxide layer was filled with an active material by a regular chemical impregnating method to produce a positive electrode.

A nickel-cadmium cell was produced using the above positive electrode, a negative electrode formed of cadmium having a bigger enough charge/discharge capacity than the positive electrode, and an electrolyte. The electrolyte was obtained by adding lithium hydroxide (LiOH) to 7N-potassium hydroxide (KOH) so that the ratio of LiOH against the theoretical capacity of the above positive electrode should be approx. 100 mg/Ah. The cell obtained in this way will be referred to Cell A.

Although the heating of the nickel plaque was done at 200° C. in the above, a heating temperature may be in a range of 150 to 250° C. for forming a conductive layer of cobalt oxide. If the nickel plaque is heated in the presence of an alkaline solution and an oxidant, the heating temperature should be 50 to 150° C.

(Comparative example I)

Cell $X_1$ was produced in the same way as Cell A except that the positive electrode was produced without forming a layer of cobalt oxide on surfaces of the nickel plaque.

(Comparative example II)

Cell $X_2$ was produced in the same way as Cell A except that lithium hydroxide was not added to the electrolyte.

(Comparative example III)

Cell $X_3$ was produced in the same way as Cell A except that the; positive electrode was produced . without forming a layer of cobalt oxide on surfaces of the nickel plaque and that lithium hydroxide was not added to the electrolyte.

(Comparative example IV)

Cell $X_4$ was produced in the same way as Cell A except that the positive electrode was produced by forming a layer of cobalt hydroxide on surfaces of the nickel plaque without heating it and that lithium hydroxide was not added to the electrolyte.

(Experiment I)

Figure 1:
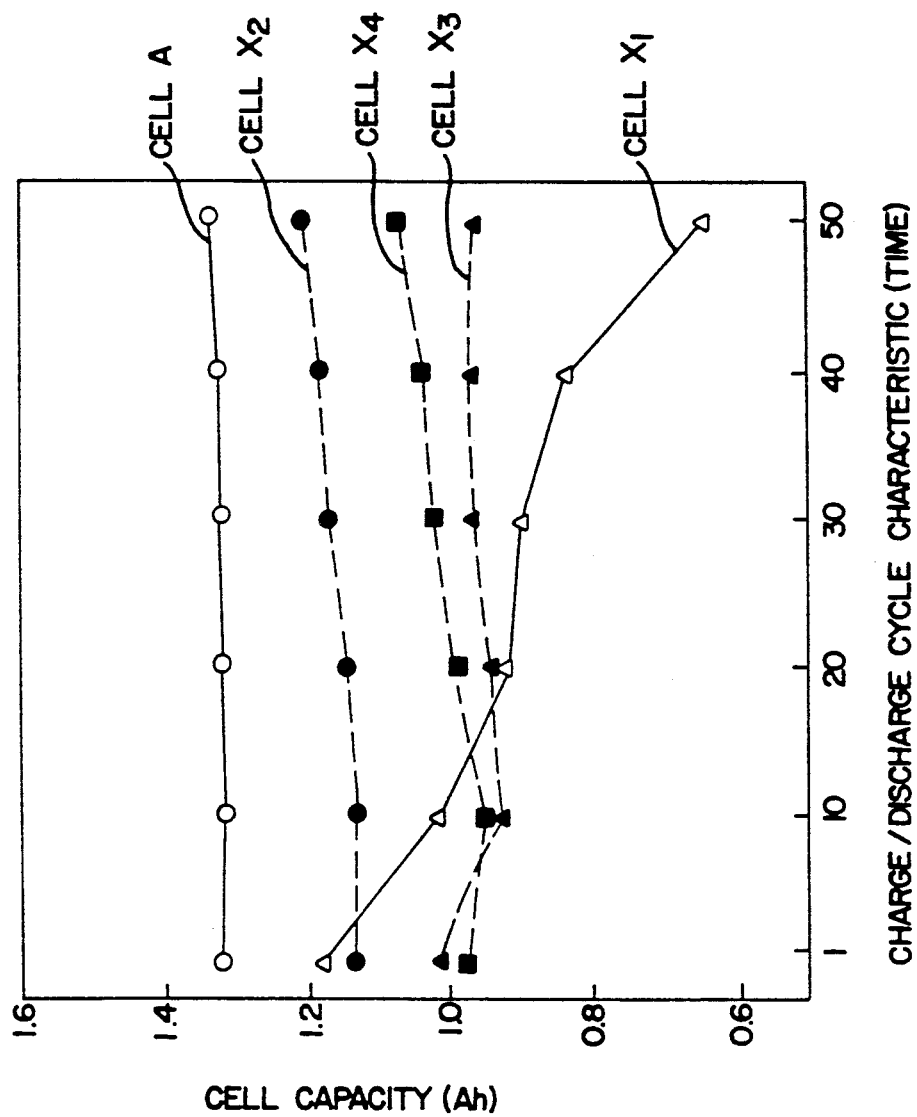
FIG. 1 is a graph showing the relationship between the charge/discharge cycle and the cell capacity concerning Cell A according to this invention and Cells $X_1$ to $X_4$ as comparative examples.

The charge/discharge cycle characteristics of Cells A and $X_1$ to $X_4$ were measured and shown in FIG. 1. The conditions were as follows:

| Charge/discharge current | 200 mAh |
| Charge amount | 160% |

-continued

| Discharge | to 0.8 V |
| Temperature | 25° C. |

As shown in FIG. 1, Cells $X_1$ decreased its cell capacity as charge/discharge was repeated. Although the Cells $X_2$, $X_3$ and $X_4$ did not decrease their capacity even as charge/discharge was repeated, they had low capacity (approx. 1.0 to 1.2 Ah) at the first cycle. On the other hand, Cell A according to this invention had large capacity (approx. 1.3 Ah) at the first cycle and did not decrease its capacity even as charge/discharge was repeated.

(Experiment II)

Figure 2:
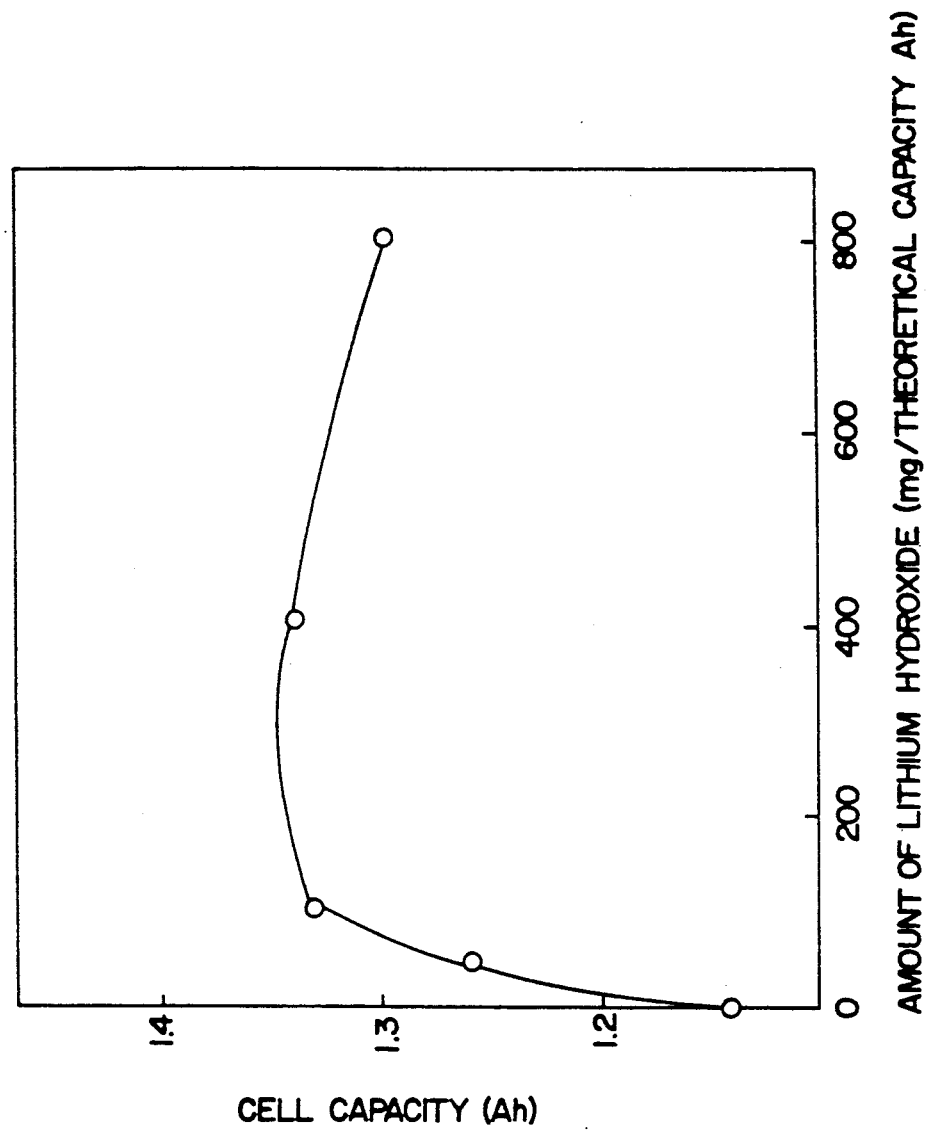
FIG. 2 is a graph showing the relationship between the amount ratio of added lithium and the cell capacity concerning the same.

FIG. 2 shows the relationship between the amount of lithium hydroxide and the cell capacity.

When the amount ratio of lithium hydroxide against the theoretical capacity of the nickel positive electrode was slightly increased, the cell capacity was drastically increased. The increase of the capacity got especially rapid when the amount ratio reached 100 mg/Ah or more. Therefore, the desirable amount ratio of lithium hydroxide is 100 mg/Ah or more.

(Experiment III)

Figure 5:
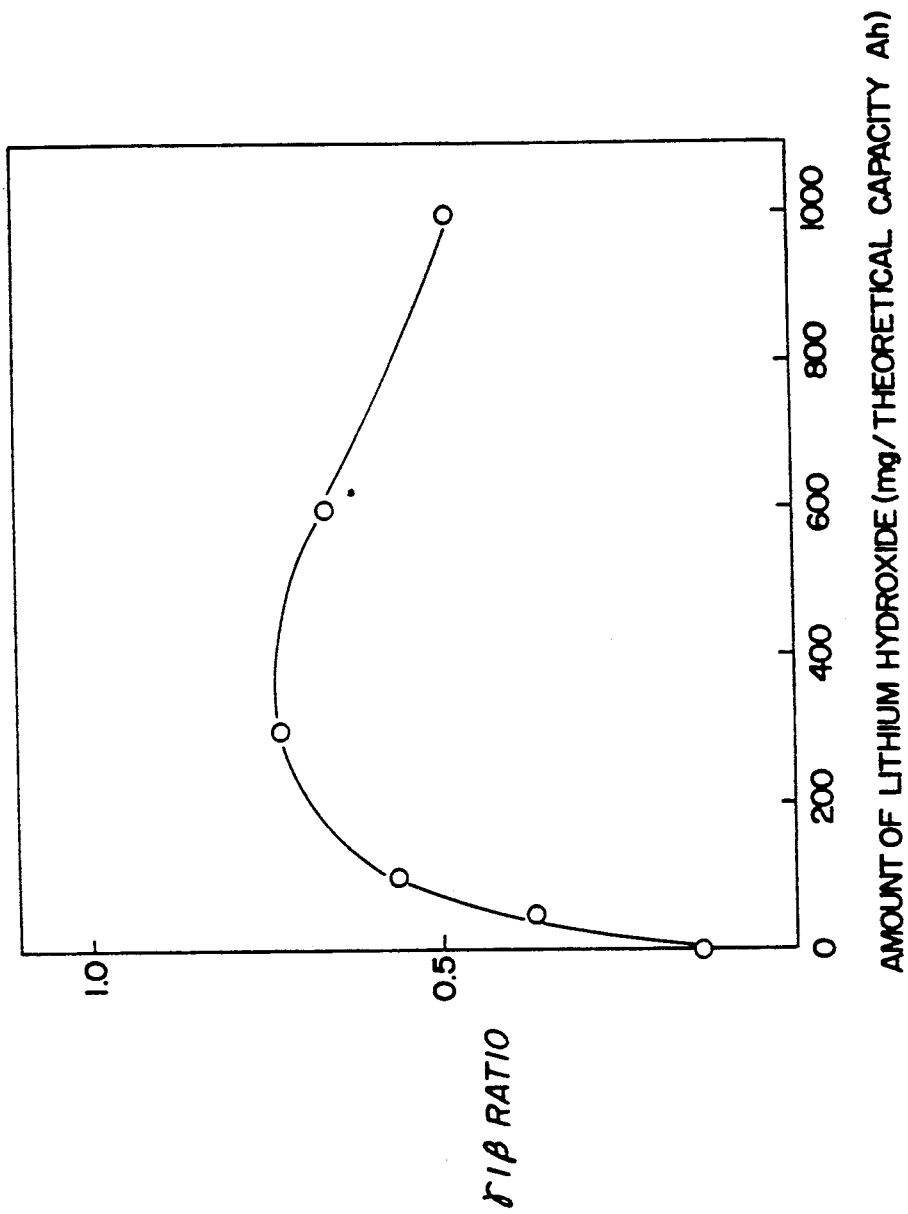
FIG. 5 is a graph showing the relationship between the amount ratio of added lithium and $\gamma/\beta$ ratio.

FIG. 5 shows the ratio in which $\gamma$-NiOOH and $\beta$-NiOOH were formed (referred to as $\gamma/\beta$ ratio hereinafter). Charging was done at 1.5C up to 150% of the electrode theoretical capacity and X-ray diffraction was conducted. The $\gamma/\beta$ ratio was obtained from the ratio of the $\gamma$-NiOOH (003) areas and the $\beta$-NiOOH (001) areas at their diffraction peaks in the chart (not shown).

As apparent from FIG. 5, when lithium hydroxide was added in a slight amount ratio against the theoretical capacity of the positive electrode, the decreased after the amount ratio of lithium hydroxide reached 400mg/theoretical capacity Ah.

Embodiment II

(Example)

A porous nickel sintered plaque was immersed in an impregnating solution mainly comprising nickel nitrate acting as an active material. The obtained plaque was immersed in an aqueous solution of cobalt nitrate having a specific gravity of 1.30 (at R.T.). Then, the plaque was immersed in a 40 ° C., 30% aqueous solution of sodium hydroxide, whereby the above cobalt nitrate was changed into cobalt hydroxide. As a result, a positive electrode having cobalt hydroxide on surfaces of the plaque was produced. The above cobalt hydroxide has a cobalt oxidation state of 2 and forms a layer independently. Cell B was produced using the above positive electrode and the same negative electrode and electrolyte as in Cell A.

(Comparative example I)

Cell $Y_1$ was produced in the same way as Cell B except that the positive electrode was produced without adding cobalt hydroxide.

(Comparative example II)

Cell $Y_2$ was produced in the same way as Cell B except that the lithium hydroxide was not added to the electrolyte.

(Comparative example III)

Cell Y3 was produced in the same way as Cell B except that the positive electrode was produced without adding cobalt hydroxide and that lithium hydroxide was not added to the electrolyte.

(Comparative example IV)

Cell Y4 was produced in the same way as Cell B except that cobalt nitrate was changed into cobalt hydroxide before a porous sintered nickel plaque was filled with an active material, and that lithium hydroxide was not added to the electrolyte.

(Experiment I)

Figure 3:
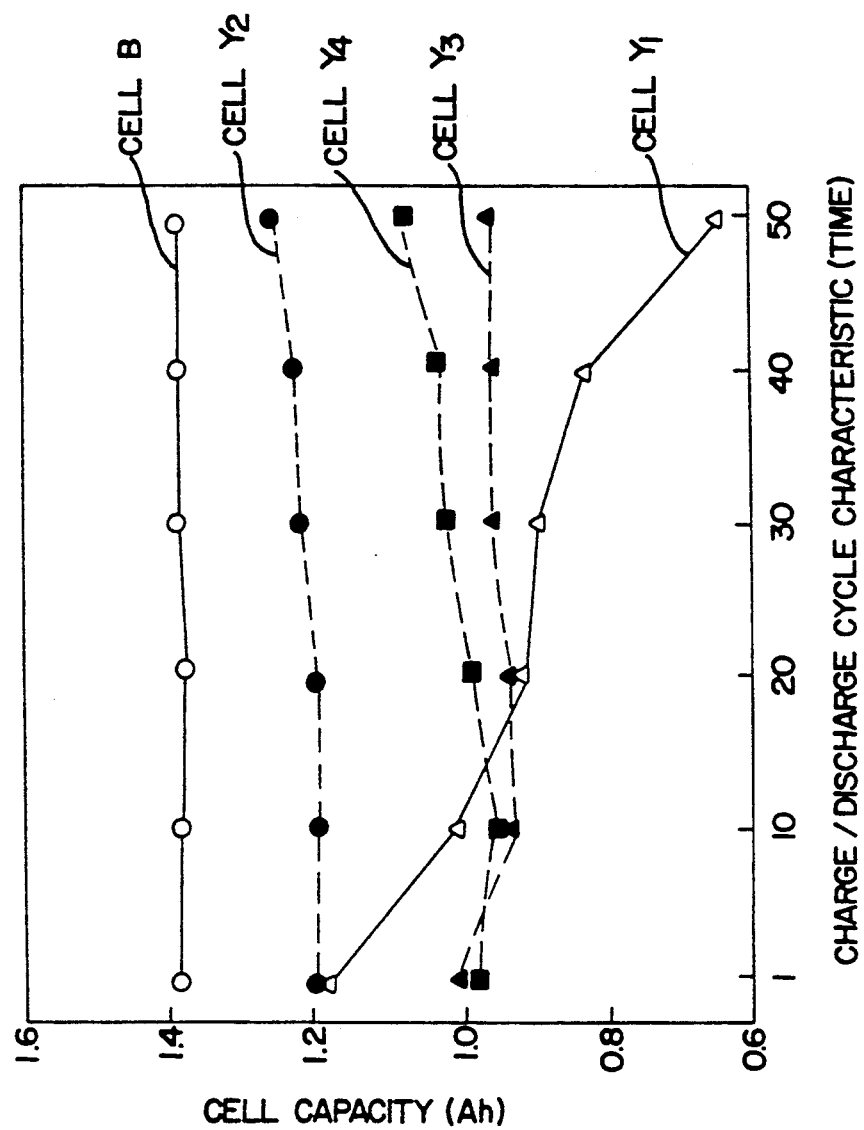
FIG. 3 is a graph showing the relationship between the charge/discharge cycle and the cell capacity concerning Cell B according to this invention and Cells $Y_1$ to $Y_4$ as comparative examples.

FIG. 3 shows the charge/discharge characteristics of Cells B and Y1 to Y4. The experiment was done under the same conditions as in the Experiment I of Embodiment I.

As shown in FIG. 3, Cell Y1 decreased its cell capacity as charge/discharge was repeated. Although the Cells Y2, Y3 and Y4 did not decrease their capacity even as the charge/discharge was repeated, they had low capacity (approx. 1.0 to 1.2 Ah) at the first cycle. On the other hand, Cell B according to this invention had large capacity (approx. 1.4 Ah) at the first cycle and did not decrease its capacity even as charge/discharge was repeated.

(Experiment II)

Figure 4:
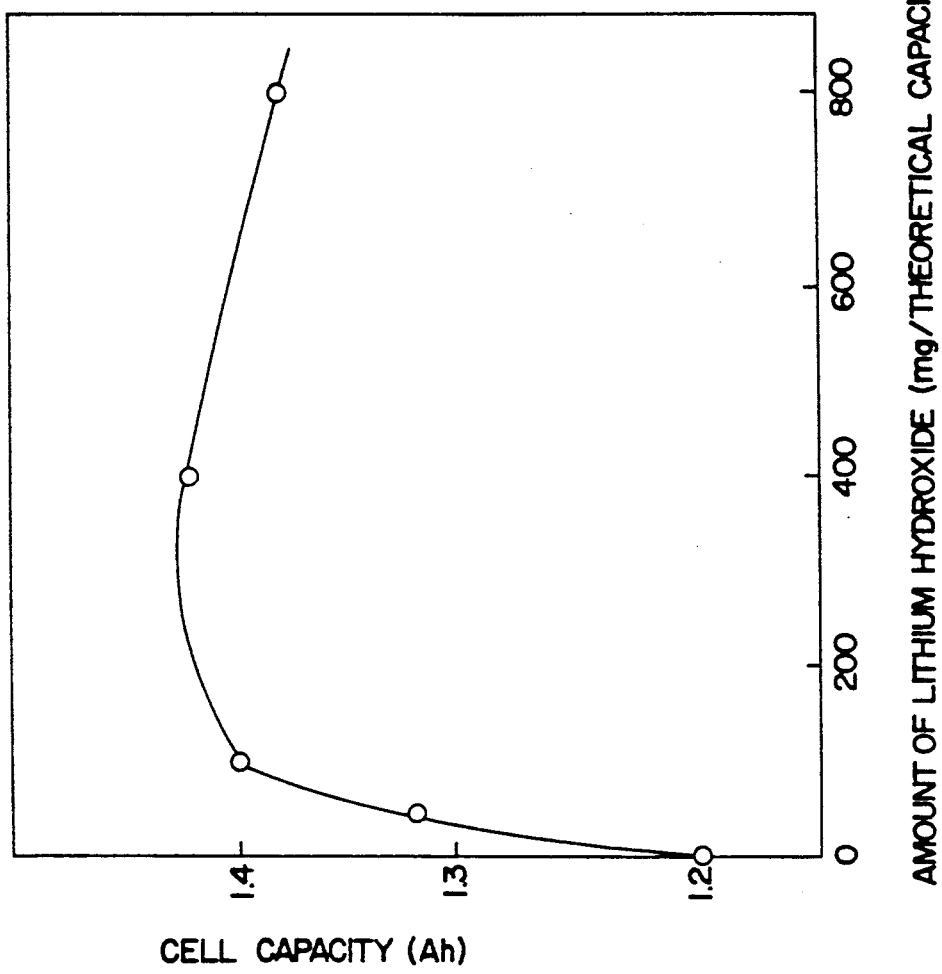
FIG. 4 is a graph showing the relationship between the amount ratio of added lithium and the cell capacity concerning the same.

FIG. 4 shows the relationship between the amount of lithium hydroxide and the cell capacity.

When the amount ratio of lithium hydroxide against the theoretical capacity of the nickel positive electrode was slightly increased, the cell capacity was drastically increased. The increase of the capacity was especially rapid when the amount ratio reaches 100 mg/Ah or more. Therefore, the desirable amount ratio of lithium hydroxide is 100 mg/Ah or more.

(Experiment III)

In order to find how to improve the discharge characteristic of a nickel sintered positive electrode, the relationship of the nickel-cobalt construction and nickel oxidation state was checked.

Five types of positive electrodes were produced as described in Table 1 and their nickel oxidation states were measured. The results are also shown in Table 1. The positive electrodes were charged at 0.1C up to 160% of the theoretical capacity and discharged at 1C down to 0.1V (V.S. Hg/HgO). After that, the positive electrodes were reduced by Fe(II)/Fe(III). The nickel oxidation states were obtained from the chemical capacity which was found by back titration.

TABLE 1

| Positive electrode | Construction | Nickel oxidation state After charging | After discharging |
|---|---|---|---|
| 1 | Forming a layer of cobalt oxide on surfaces of a plaque | 3.04 | 2.16 |
| 2 | Forming a layer of cobalt hydroxide on surfaces of an active material | 3.05 | 2.15 |
| 3 | Forming a layer of cobalt hydroxide on surfaces of a plaque | 3.05 | 2.25 |
| 4 | Coprecipitate an active material and cobalt hydroxide | 3.06 | 2.25 |
| 5 | No cobalt compound added | 3.05 | 2.27 |

As shown in Table 1, the nickel oxidation states after charging were substantially the same for all the electrodes. As for the nickel oxidation states after discharging, however, Electrodes 1 and 2 showed lower oxidation states than Electrodes 3 to 5. Therefore, it can be said that depth of discharge is improved by employing the constructions of Electrodes 1 and 2.

In Electrode 4, cobalt hydroxide is considered to form a solid solution or a mixed crystal together with nickel.

When cobalt hydroxide is added in Embodiment II, it is desirable to add it so that the surface area of the cobalt hydroxide layer can be as large as possible to improve the conductivity and utilization factor of the active material.

In Embodiments 1 and 2, the amount of cobalt forming the cobalt compound is preferably in an atomic ratio of 2 to 8% against the total amount of active material (total amount of nickel and cobalt) of the nickel positive electrode, or more preferably 3 to 7%. With the above atomic ratio, even if the amount of added cobalt is small, a good effect is obtained.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A rechargeable alkaline storage cell comprising:
   a nickel positive electrode comprising a metal plaque, a layer of active material, and an independent layer of cobalt oxide provided between a surface of the metal plaque and the layer of active material;
   a negative electrode; and
   an electrolyte comprising a solution of potassium hydroxide additionally containing lithium hydroxide in an amount ratio of at least 100 mg/Ah against the theoretical capacity of said positive electrode.

2. A rechargeable alkaline storage cell as in claim 1, wherein the amount of cobalt forming the cobalt oxide is in an atomic ratio of 2 to 8% against the total amount of the active material of said nickel positive electrode.

3. A rechargeable alkaline storage cell as in claim 1, wherein the cobalt oxidation state in the cobalt oxide is more than 2.

4. A rechargeable alkaline storage cell comprising:
   a nickel positive electrode comprising a porous metal plaque retaining an active material including a nickel hydroxide, and an independent layer of cobalt hydroxide formed on a surface of the active material;

a negative electrode; and
an electrolyte comprising a solution of potassium hydroxide additionally containing lithium hydroxide in an amount ratio of at least 100 mg/Ah against he theoretical capacity of said positive electrode.

5. A rechargeable alkaline storage cell as in claim 4, wherein the amount of cobalt forming the cobalt hydroxide is in an atomic ratio of 2 to 8% against the total amount of the active material of said nickel positive electrode.

6. A rechargeable alkaline storage cell as in claim 4, wherein the cobalt oxidation state in the cobalt hydroxide is 2.

* * * * *